April 25, 1933.   W. M. GROSS   1,905,855
LOADING AND DUMPING TRUCK
Filed April 28, 1932   4 Sheets-Sheet 3
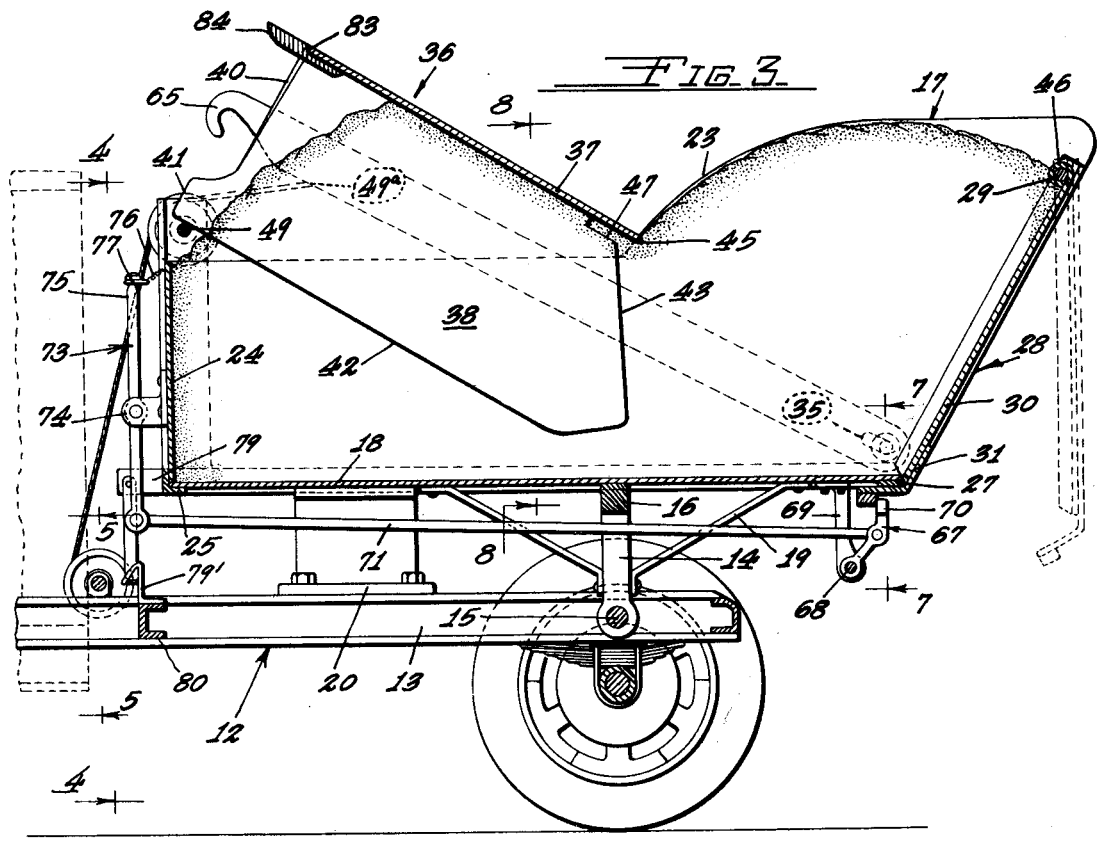
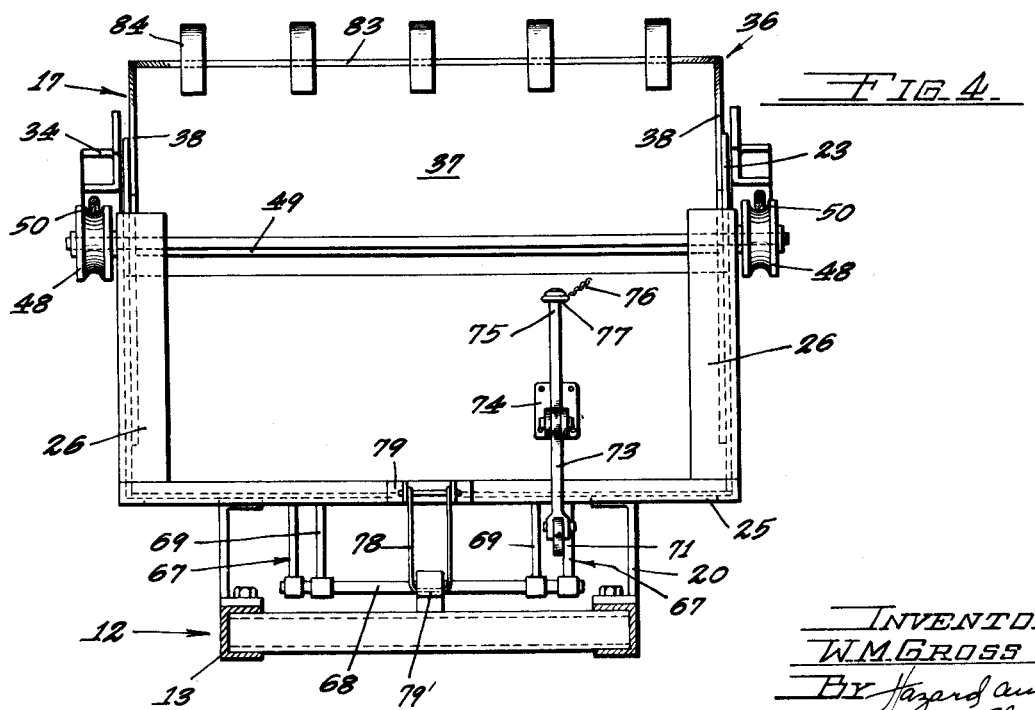
INVENTOR
W. M. GROSS
By Hazard and
Miller
ATTORNEYS April 25, 1933.   W. M. GROSS   1,905,855
LOADING AND DUMPING TRUCK
Filed April 28, 1932   4 Sheets-Sheet 4
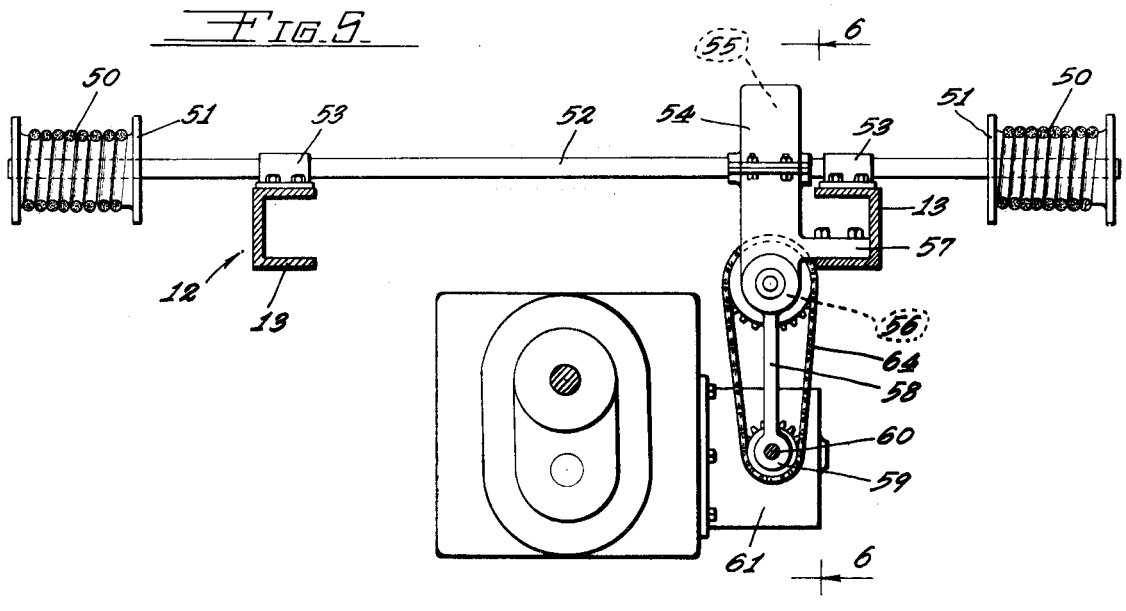
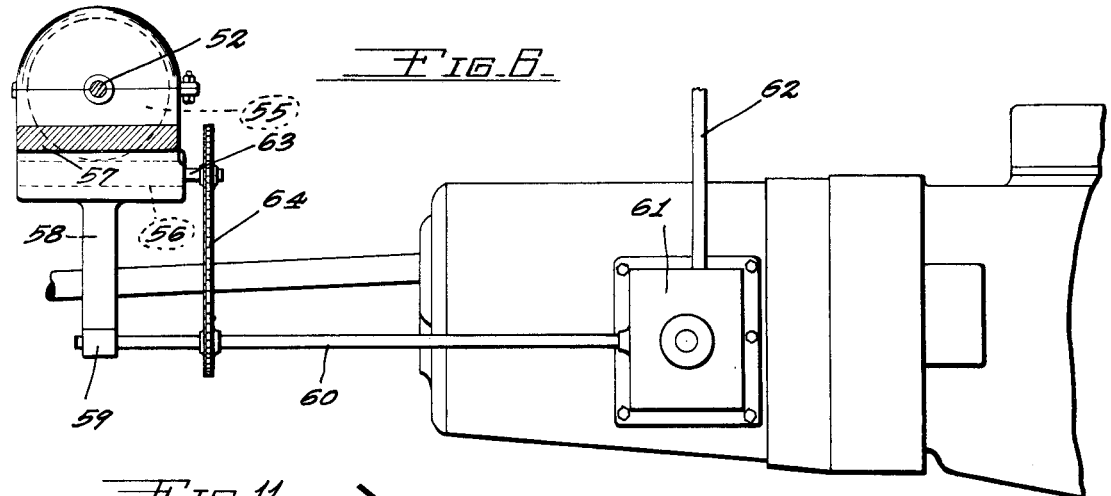
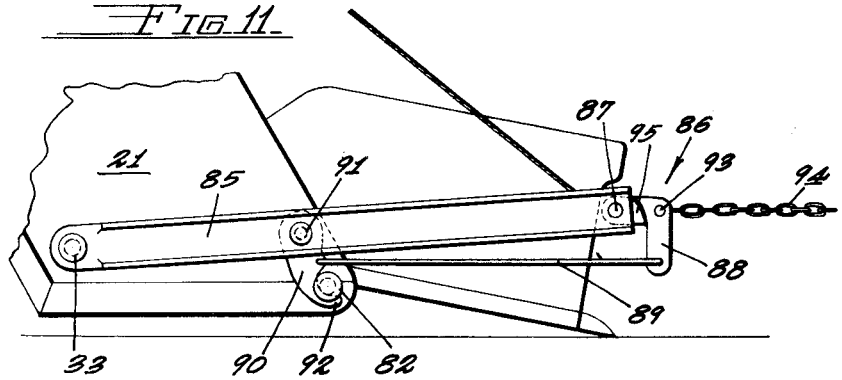
INVENTOR
W. M. GROSS
By Hazard and Miller
ATTORNEYS Patented Apr. 25, 1933

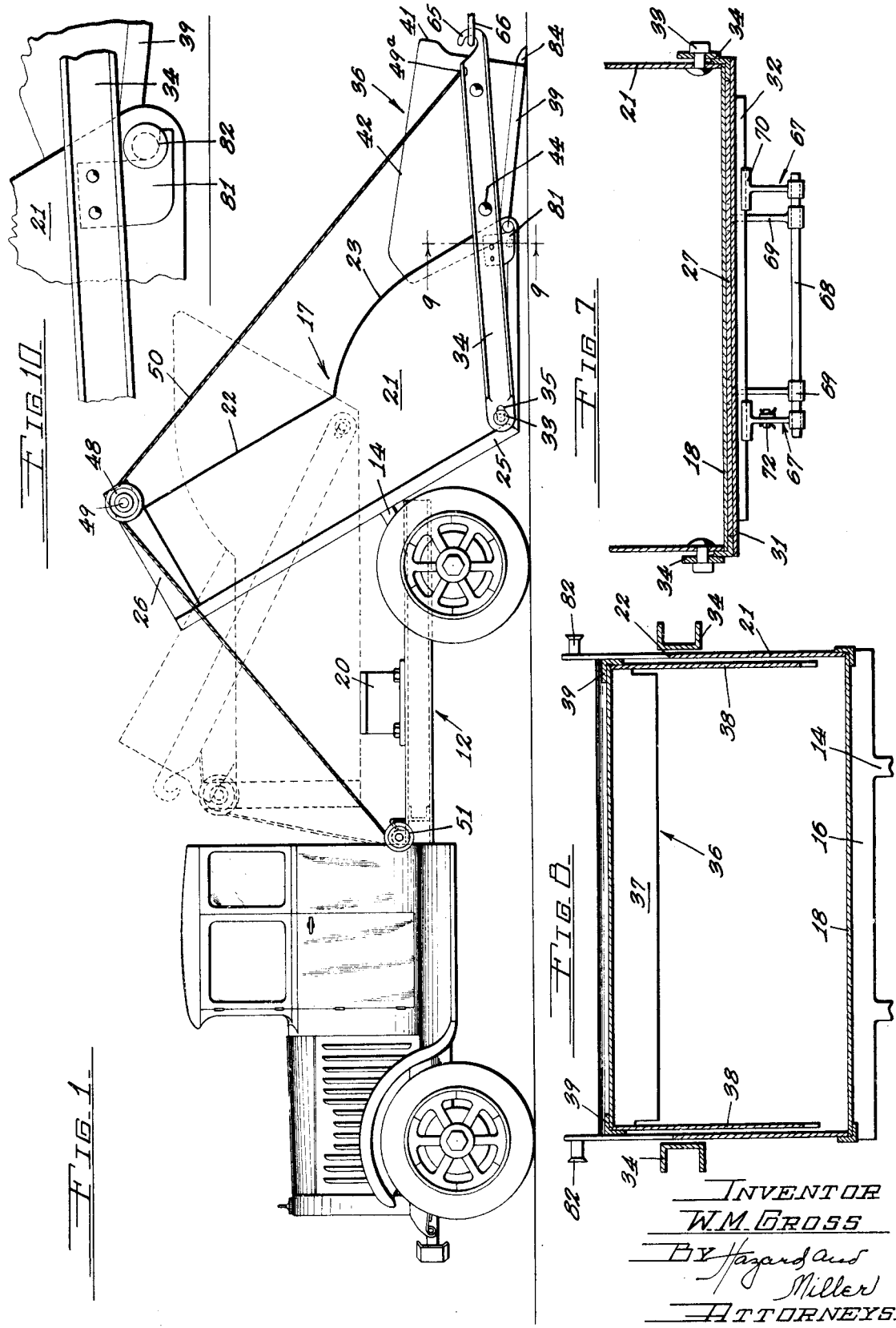

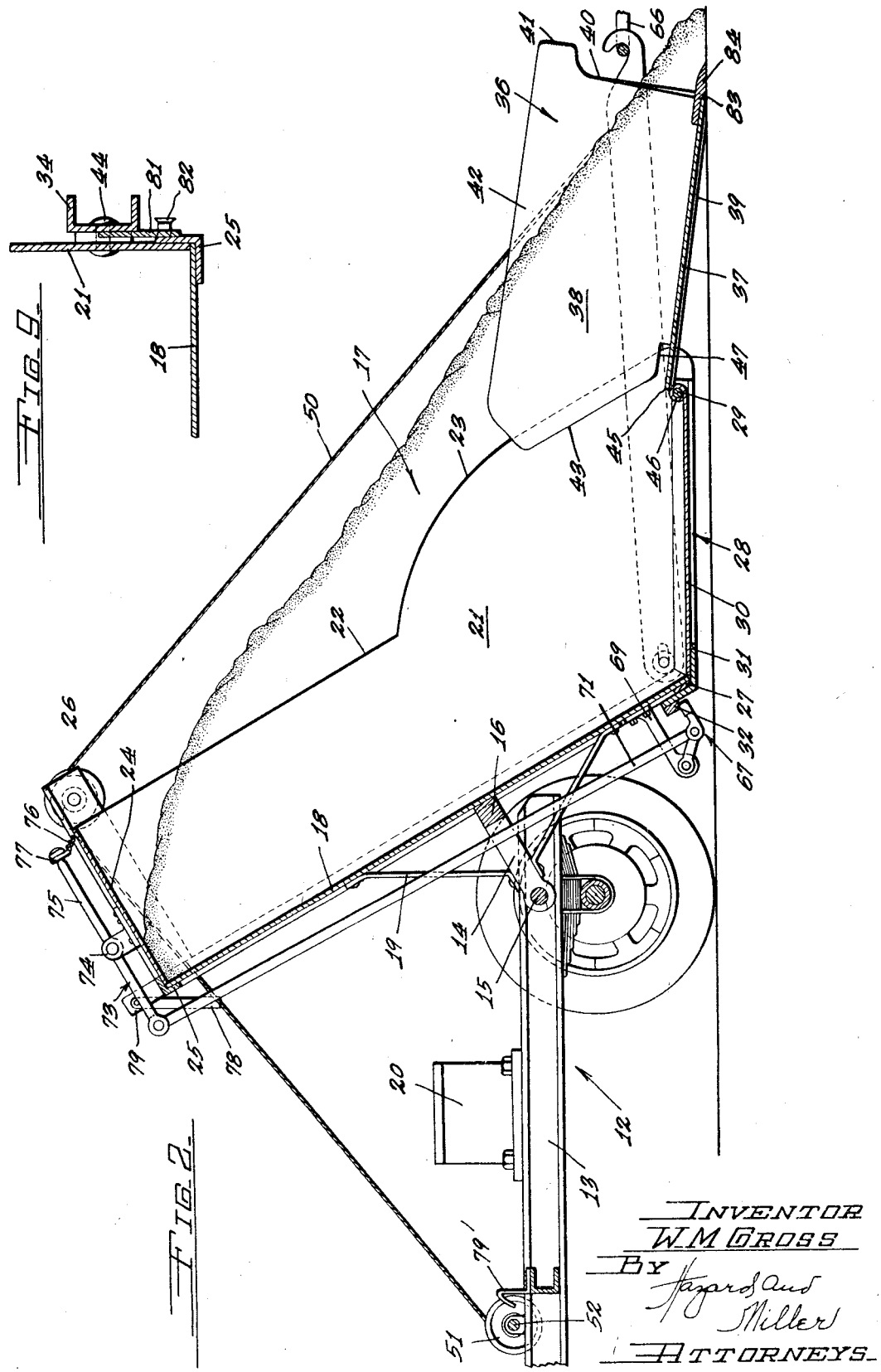

1,905,855

UNITED STATES PATENT OFFICE

WILLIAM M. GROSS, OF LAS VEGAS, NEVADA, ASSIGNOR OF ONE-HALF TO WILL BECKLEY, OF LAS VEGAS, NEVADA

LOADING AND DUMPING TRUCK

Application filed April 28, 1932. Serial No. 608,019.

A main feature of my invention is the construction of a truck body which, when in a tilted position, may be used for loading such body, this being by towing the tilted truck body with the truck rearwardly so as to force the lower portion of the body into a mass of loose material which is to be loaded on the truck.

An object and feature of my invention is to provide a type of dumping truck which may be loaded by a bucket or shovel connected to the truck forming part of the dump truck body when the bucket and part of the body are drawn into the material to be loaded.

Another object and feature of my invention is the construction of a dump truck body which may be tilted and drawn rearwardly by a tractor or the like and thereby force more or less loose material into said dump truck body, and after obtaining a full load the body may be brought into the horizontal, that is, into the transporting position.

A further object and feature of my invention is providing a dump truck, and especially a body for such truck, with a pivotally mounted shovel or bucket which may swing from one position to another relative to the body and when the body is fully tilted with its rear end adjacent the ground, the bucket may be swung on its pivot to torm a rearward extension of such rear end, then, by drawing rearwardly on the truck body and, hence, the truck, the bucket may be caused to dig into loose material and force this into the body of the truck.

A further feature of the pivoted bucket or shovel is that after a sufficient load has been placed in the rear and lower end of the tilted truck body, the bucket may be hoisted to lift a considerable portion of the load from the lower rear tilted end to the upper tilted end and thereby substantially cause a balance of the load so that the dumping body may be rotated from the tilted loading position to the horizontal transporting position.

Another detail and object and feature of using the tilting bucket is that this smooths or rounds off the load at the rear portion of the truck and confines and retains the load on the front part, which load at this portion may extend above the top of the truck body, being held in place by the inverted bucket when the body is in the horizontal transporting position.

Another detailed feature of my invention relates to the hoist used for permitting tilting and swinging downwardly of the pivoted bucket and also pulling this bucket upwardly and righting the body. Combined with this there are the features of the towing connection for using a tractor to pull the bucket and tilted truck body into the load.

Further detail features of my invention relates to a dumping gate at the back which may be operated from the front of the truck body for releasing the gate at the back of the truck for dumping the load.

In constructing my dumping truck body, this, as a body structure, may be considered as somewhat similar to ordinary truck bodies having a floor, opposite sides, a front wall, and a gate at the rear end. This is pivoted on a truck chassis, but in my construction the side walls adjacent the back portion are curved upwardly to a considerable elevation above the forward part of these side walls, the curve of the upper edge of this rear portion preferably being in an arc. The bucket or shovel is formed with a bottom and two sides, open at opposite ends, this, therefore, being somewhat trough or channel shaped with, preferably, teeth at the cutting end. This bucket is preferably mounted on pivoted arms which are pivoted to the sides of the body adjacent its lower back corner. When the truck is in the transporting position, the floor is horizontal and the back wall having the dumping gate climbs upwardly and rearwardly. The angle between this and the floor is such that when the truck body is in a tilted position for loading, the gate is substantially parallel to but slightly above the ground. The bucket on the swinging arms is designed to have the rear end of the floor of the bucket engage the upper edge of the gate, and for the bucket to have teeth digging into the material to be loaded into the truck body. As above mentioned, this may be done by bodily pulling the truck body rearwardly by means of a tractor or the like.

When the bucket is raised by a hoist, it lifts the residual material which has been forced into the body of the truck, bringing this to the upper and forward end of the tilted body so that the body may readily be swung back from the tilted to the horizontal position. This also smooths off the load in the rear portion of the truck body at the top.

My invention is illustrated in the accompanying drawings, in which:

Fig. 1 is a side elevation of the truck with the body and bucket in the loading position, illustrating the transporting position in dotted lines.

Fig. 2 is a vertical longitudinal section showing the body and the bucket in the loading position.

Fig. 3 is a longitudinal section showing the body and the bucket in the transporting position and the gate being illustrated dotted for dumping or discharging the load.

Fig. 4 is a vertical transverse section on the line 4—4 of Fig. 3 in the direction of the arrows.

Fig. 5 is a vertical transverse section on the line 5—5 of Fig. 3 in the direction of the arrows, showing the elevating drums and the drive connection therefor.

Fig. 6 is a side elevation of part of the truck, showing the drive connection for the elevating gear.

Fig. 7 is a vertical transverse section on the line 7—7 of Fig. 3 in the direction of the arrows.

Fig. 8 is a vertical transverse section on the line 8—8 of Fig. 3 in the direction of the arrows.

Fig. 9 is a detailed transverse section on the line 9—9 of Fig. 1 in the direction of the arrows, illustrating the draft bars on the bucket and the hook connection to the truck body.

Fig. 10 is a detailed side elevation showing part of the draft bars of the bucket and the hook connection to the body.

Fig. 11 is a partial side elevation showing a modified form of draft bars of the bucket and a pivot hook connection to the body, the opposite side being the same.

In the illustrations I have shown a truck chassis, the rear end of which has a frame 12 for mounting and carrying the truck body. In the construction shown, the truck frame has a pair of longitudinal beams 13, to each of which there is secured a pivoted post 14 pivoted at 15 and a crossbar 16 connecting these posts. The truck body designated 17 rests on the posts and the crossbar. This has a floor 18, to which the crossbeam is connected, and diagonal braces 19 from the post to the floor give a rigid mounting. A supporting buffer block or plate 20 placed forward of the pivot 15 supports the body in a horizontal position when fully loaded.

The truck body has side walls 21 of which the forward section of each has an upper edge 22 parallel to the floor. At the rear portion the upper edge 23 is curved upwardly approximately in the arc of a circle with the lower rear corner being substantially the center of the arc. A front wall 24 connects the forward ends, this preferably having an angle iron 25 across the bottom and vertical angle irons 26. These extend above the top edge 22. At the rear of the body underneath the floor there is a crossbar 27. The body is closed at the rear by a gate 28. This gate is pivoted on a pivot hinge 29 which extends between the rear upper ends of the side walls of the truck body. This gate has a plate 30 and at the bottom of the plate there is an angle 31 bent into an obtuse angle. This angle carries a latching or locking bar 32.

Secured to each side of the body adjacent the rear lower end there is a pivot stud 33, to which are connected the draft bars 34. These bars are illustrated as having a slot 35 to allow a slight movement on the pivot stud 33. The bucket or shovel designated by the assembly numeral 36 has a bottom plate 37 and two side plates 38. These are preferably connected by angles 39. The side plates each have a vertical end edge 40 offset rearwardly at the top as indicated at 41. The top edge 42 is substantially parallel to the bottom plate 37. The forward edge 43 is designed to fit inwardly and to project forwardly of the rear portion of the curved part 23 of the truck sides, as indicated in Fig. 2. The draft bars 34 are rigidly secured to the sides 38 of the bucket by means of rivets 44 or the like. The forward or inner edge 45 of the bottom plate of the bucket is designed to ride on the eye or hinge 46 of the gate above the hinge pin 29 when the bucket is lowered, as illustrated in Fig. 2. The sides of the bucket have each a notch 47 adjacent their forward portion. The elevating means for the bucket and for tilting the truck body into its transporting position employ a pair of pulleys 48 which are mounted on a transverse pulley shaft 49, this shaft being journaled in the upper parts of the angles 26. Over each of these pulleys extends a cable 50. This cable is secured at one end to the outer end 49a of the draft bars. Each cable is wound on a drum 51 on a drum shaft 52, which is mounted in journals 53 on the beams 13 of the truck frame. This shaft is illustrated as being rotated by a gear train mounted in a gear box 54, which box has a worm wheel 55 secured to the shaft 52 driven by a worm 56. The gear housing 54 is secured by a base plate 57 to one of the beams of the truck frame. From this gear housing there extends a downwardly directed arm 58 which has a bearing 59 at the bottom for a drive shaft 60. This drive shaft connects to a transmission gear 61 which is mounted, preferably, on the side of the engine transmission.

This transmission is controlled by a hand lever 62 and is designed to give forward and reverse movements and to be placed in a neutral position. The drive from the shaft 60 to the worm shaft 63 is illustrated as by means of a sprocket and sprocket chain connection 64.

The draft bars 34 have hooks 65 at the ends, to which may be attached a draft connection 66 for pulling the shovel, the truck body, and the truck, rearwardly, this being designed for connection to a tractor or other type of pulling appliance.

The gate is latched by means of latching dogs 67. These are illustrated as mounted on a rock shaft 68 journaled in depending brackets 69 from the floor of the truck body adjacent the rear end and each of these dogs has a jaw 70 to engage the rod 32. A link 71 is connected as indicated at 72 to one of the dogs and leads forwardly to a rocking lever 73. This lever is pivoted on a bracket 74 on the front wall 24 of the truck body and has a hand grip 75 at the top. A chain 76 having a ring 77 is used to hold the lever in its locking position, one end of the chain being secured to the forward end of the truck body and the ring fitting over the hand grip end. In order to hold the truck in its transporting or horizontal position, a latching link 78 is pivoted to a bracket 79 extending forwardly from the front end of the truck. This link engages a hook 79' secured to a cross beam 80 on the truck frame.

In the operation and use of my dumping and loading truck, the body and the bucket are in the position of the dotted lines of Fig. 1 when empty and when transporting a load. The truck may be backed to a position near material to be loaded, which material need not be arranged in a pile but may, for instance, be part of a road surface of material to be excavated. The truck body is then tilted from the dotted line position of Fig. 1 to the full line position. The truck body is substantially balanced so that it is easy for this to be tilted by manual operation, or I may employ any type of tilting arrangement, such as is common with dump or tilting trucks. When the body is tilted, the gate should be latched in its closed position. The body may be allowed to tilt over until the gate contacts with the ground, or a stop may be used to limit the tilting movement. When the truck body tilts, the bucket or shovel 36 swings downwardly, the draft bars 34 pivoting on the studs 33, and in this operation the drums must be turned to unwind the cables. For this purpose the control lever 62 for the power drive may be located in a neutral position, or, if desired, a reverse movement given to the gear transmission to rotate the drums in the proper direction for unwinding the cables. The draft connection 66 is then attached to the hooks 65, this draft connection being connected to a horse drawn equipment, but preferably to a tractor of the endless chain type of tread. The pull on the draft bars allows these bars to slip on the stud 33 and to bring the hooks 81, which are secured to each draft bar, into engagement with a pulling stud 82 connected to the upper and rear corner of the side walls 21 of the truck body. This action causes the cutting edge 83 of the bottom plate of the bucket, and the teeth 84 secured thereto, to dig into material which may be either on a road surface or piled. The hooks 81, by engaging the studs 82, also slightly lift the gate or rear end of the truck body above the ground level. Thus there is a slight upward stroke of the bottom 37 from its front edge digging into the ground to its rear edge 45 resting either on or inside of the hinge 29 of the gate. As the whole truck with the bucket and the truck body is pulled rearwardly, the material to be excavated and transported is forced through the bucket into the truck body and by this up into the body much as illustrated in Fig. 2. When a sufficient load is obtained, the shaft 52 is rotated in the proper direction to turn the drums 51 to wind in the two cables. The first action is to elevate the bucket 36, this pivoting on the pivot studs 33 at the ends of the draw beams 34. The inner edge 45 of the bottom plate of the bucket has a turning motion forming part of the arc of a circle, which tends to smooth the rear portion of the load as indicated in Fig. 3. This motion also slightly compresses and holds the material being excavated in a lower part of the tilted body, this material resting on the inside of the gate and against the sloping floor of the body. In the further movement of winding in the cables, the bucket is tilted to the position of Fig. 3, then a further winding in of the cables moves the tilted truck body from its loading position to its horizontal transporting position of Fig. 3. It will be noted that the side walls 38 and the bottom plate 37 of the bucket allowing filling of the truck body above the upper edge 22 of the side walls and the inverted bucket holds the forward part of the load in place. The latch link 78 may then be engaged with its complementary hook 79' and thus hold the loaded truck body in its position for transporting the load.

When it is desired to dump the load, the latch link 78 is disconnected from its hook, the chain 76 is disconnected from the hand lever 73, and this is locked in such a manner as to disengage the dogs 77 from the rod 32. The gate then swings from the full line to the dotted line position of Fig. 3, allowing part of the load to be discharged. The truck body may then be tilted into its loading position except that it is unnecessary to allow the bucket to swing down, as the load will be discharged between the bottom plate of the bucket and the floor of the truck. If the truck is dumping on to a horizontal surface, the body need only be tilted sufficiently to allow the body to clear the bottom of the truck. If the truck is moved forwardly while being dumped, the bucket may trail on the ground until the load is completely dumped. The hoisting drums and hoisting cables are then used with the power from the engine to tilt the body from its dumping to its transporting position to return for another load.

In Fig. 11 I have illustrated a modified construction of draft appliance. This draft appliance is the same on both sides of the truck body. In this case a stud similar to 33 is used with the draft bars 85 being connected to these studs without any slip or longitudinal movement. A draft bell crank 86 is pivotally connected at 87 to the outer end of each draft bar. This bell crank has a depending arm 88 with a link 89 connected thereto. Each of these links is connected to a pivoted latch hook 90 pivoted at 91 to each draft bar and having a hook 92 to engage the draft stud 82 on the truck body. In this construction I preferably employ a cross rod 93 between the bell cranks to hold these a fixed distance apart. Then a draft chain 94 may be connected to these bell cranks and to the pulling power, such as a tractor. As Fig. 11 is an elevation of one side the draft bar 85, depending arm 88, latch hook 90, and connecting link 89 on the opposite side are blocked from view. The draft chain 94 connects to both depending arms 88.

In the operation of this construction, after tilting of the truck body to its loading position and permitting the lowering of the bucket, the pulling of the draft chain swings the bell crank 86 in order to pull on the link 89 and cause the hook portion 92 of the latch hook 90 to engage the pulling stud 82. This action slightly raises the gate end of the truck above the ground level. In this construction, when the cables are wound in for elevating the bucket and swinging the truck body to its transporting position, the latch hooks 90 are readily released from the stud 82. In order that the pull on the draft chain 94 will not cause an excessive tension on the link 89 and, hence, an excessive pressure of the latch hook 90 on the stud 82, I provide stop lugs 95 on the bell crank 88, which stop lugs engage the end of the draft bars 85 when the bell crank is swung upwardly. This causes the main pull to be exerted directly through the draft bars to the pivot ends 33.

It will be noted that when the bucket is in the loading position that this functions as a scraper or a scraper blade and it may be used for excavating and at the same time leveling a road or other surface from which material is to be removed. It functions as a bucket when elevated, and the material is prevented from flowing out of the elevated bucket by the material which has been forced into the lower tilted end of the truck body.

Various changes may be made in the details of construction without departing from the spirit or scope of the invention as defined by the appended claims.

I claim:

1. In a dump truck having a body with a floor, side walls, and a rear end, the body being tiltably mounted on the truck, said body being adapted to tilt rearwardly to bring the floor into an inclined position and the rear end contiguous to the ground, means for attaching a draft connection to the rear portion of the truck body to move said body and the truck rearwardly and force a load of loose material into the rear portion of the truck body, and means to tilt the truck body to bring the floor into horizontal position for transportation of the load, an excavating bucket operatively connected to the truck body to engage the material for the load and to support and guide the load while being forced into the truck body, and means to lift the bucket relative to the body to deposit part of the load in the body.

2. In a dump truck having a truck frame with a truck body movably mounted thereon to tilt into an inclined position and bring the rear end of the body contiguous to the ground, an excavating bucket operatively connected to the truck body to engage the material to form a load, and a draft connection operatively connected to the truck body for moving the bucket, the body, and the truck rearwardly for the forcing of a load of material through the bucket on to the bucket and into the body, the bucket being movably mounted on the truck body, means to raise the bucket relative to the tilted body, and means to tilt the body with the elevated bucket to bring the body into a horizontal position for transportation of the load.

3. In a dump truck having a truck chassis with a truck body pivotally mounted thereon, said body having a floor, opposite sides, and a rear end, a bucket pivotally connected to the truck body, the truck body being tiltable to incline the floor and to bring the rear end contiguous to the ground, said bucket turning on its pivot to engage the end of the bucket with the material to be loaded, and means adapted for attachment of a draft connection to the bucket and to the truck body to move the bucket, the body, and the truck chassis as a unit rearwardly to thereby force the bucket into material to form the load, and a hoisting means to tilt the body to bring the floor into a horizontal position for transporting the load.

4. In a dump truck as claimed in claim 3, said hoisting means being connected to the bucket and adapted to first raise the bucket relative to the body and when the bucket is completely raised to tilt the body.

5. In a dump truck having a truck chassis, a pivotally mounted body having a floor, opposite sides, and a rear end, a pair of draft bars pivotally connected to the body adjacent the rear end, a bucket formed trough-shaped and attached to said draft bars, said draft bars having means for attaching a draft connection for pulling the bucket, the body, and the truck chassis as a unit in a rearward direction, and means operatively connected to the truck body for moving the body on the chassis to bring the floor into a horizontal position for transporting the load.

6. In a dump truck as claimed in claim 5, said elevating means having a connection to the bucket to move the bucket upwardly on the pivot of the draft bars to shift the bucket from a position contiguous to the rear end of the truck body to a position toward the forward end of such body with the bucket substantially turned upside down, said elevating means in further movement turning the truck body on its pivot to bring the floor in a horizontal position for transporting its load.

7. In a dump truck having a truck chassis, a pivotally mounted body having a floor, opposite sides, and a rear end, a pair of draft bars pivotally connected to the body adjacent the rear end and the floor, a bucket formed trough-shaped attached to the draft bars, said draft bars having means for attaching a draft connection, an interconnecting means between the draft bars and the rear end of the truck body adjacent the top of the sides on pulling on the draft connection, and means for elevating the bucket and tilting the truck body with the floor horizontal for transportation of the load.

8. In a dump truck as claimed in claim 7, said elevating means comprising cables, drums on the truck chassis on which said cables are wound, guide pulleys positioned at the front end of the truck body adjacent the top of the sides, the free ends of the cables being connected to the rear portion of the bucket, said cables being adapted to tilt the bucket to a substantially inverted position to the truck body prior to tilting the truck body to a horizontal position.

9. In a dump truck having a truck chassis, a pivotally mounted body having a floor, opposite sides, a rear end, a pair of draft bars having a pin and slot pivot connection to the body adjacent the rear end and adjacent the floor, a bucket formed trough-shaped attached to the draft bars, said draft bars having means for attaching a draft connection, each draft bar having a depending hook, a stud secured to the sides adjacent the rear end and at the top of such sides, said draft bars having a slippage by the pin and slot connection for interengagement of the hooks and the stud on pulling on the draft connection, and means for elevating the bucket and for tilting the body to bring the floor into a horizontal position from an inclined loading position.

10. In a dump truck having a truck chassis, a pivotally mounted body, a pair of draft bars pivoted to the body adjacent the rear end, a bucket secured to said arms and having a draft connection, a stud secured to the body adjacent the rear end and adjacent the top, and a latch hook on each bar to engage the stud on a pull being exerted on the draft connection.

11. In a dump truck having a truck chassis and a pivotally mounted body with a gate pivoted at the top and rear end of the body, said gate having a crossbar at its lower end, and pivotally mounted latching dogs to engage said bar, a link extending underneath the body and connected to the latching dogs, and a hand lever pivotally connected to the forward end of the body and to the link.

12. In a dump truck having a truck chassis, a pivotally mounted body, a draft bar pivoted to one side of the body adjacent the rear end, a bucket secured to said arm and having a draft connection, a stud secured to the body adjacent the rear end and adjacent the top, a latch hook on said bar to engage the stud on a pull being exerted on the draft connection, said latch hook being pivotally connected to the draft bar, the means forming a draft connection comprising a bell crank on the rear end of the draft arm, and a link between the bell crank and the latch hook.

13. In a dump truck having a truck chassis, a body pivotally mounted thereon, a draft bar pivotally connected to the body adjacent its rear end and adjacent the bottom, a trough-shaped bucket attached to the draft bar, a pivotally mounted latch hook on the draft bar, a fixed stud on the body adjacent the rear end and adjacent the top for engagement by the hook, a bell crank pivotally connected to the outer end of the draft bar and having a draft connection, and a link from the bell crank to the latch hook.

In testimony whereof I have signed my name to this specification.

W. M. GROSS.